(12) United States Patent
Dasgupta et al.

(10) Patent No.: US 8,396,822 B2
(45) Date of Patent: Mar. 12, 2013

(54) CLUSTERING COOKIES FOR IDENTIFYING UNIQUE MOBILE DEVICES

(75) Inventors: Anirban Dasgupta, Berkeley, CA (US); Liang Zhang, Fremont, CA (US); Maxim Gurevich, Cupertino, CA (US); Achint Oommen Thomas, Buffalo, NY (US); Belle Tseng, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 322 days.

(21) Appl. No.: 12/978,186

(22) Filed: Dec. 23, 2010

(65) Prior Publication Data

US 2012/0166379 A1 Jun. 28, 2012

(51) Int. Cl.
*G06N 5/02* (2006.01)

(52) U.S. Cl. ........................................ 706/50

(58) Field of Classification Search .................... None
See application file for complete search history.

(56) References Cited

U.S. PATENT DOCUMENTS

| | | | | |
|---|---|---|---|---|
| 7,962,603 | B1 * | 6/2011 | Morimoto | 709/224 |
| 8,024,454 | B2 * | 9/2011 | Campbell et al. | 709/224 |
| 2010/0228850 | A1 * | 9/2010 | Fomitchev | 709/224 |
| 2012/0072554 | A1 * | 3/2012 | Cao et al. | 709/220 |

OTHER PUBLICATIONS

"Cookie-Based Counting Overstates Size of Web Site Audiences—comScore, Inc." comScore, Inc. Press Release, Apr. 16, 2007, 3 pages www.comscore.com/Press_Events/Press_Releases/2007/04/comScore_Cookie_Deletion_Report, accessed Jan. 28, 2011.

Agarwal, D., et al. "Regression-Based Latent Factor Models," Proceedings of the 15th ACM SIGKDD International Conference on Knowledge Discovery and Data Mining, ACM, 2009, p. 19-27.

Eckersley, P., "How Unique is Your Web Browser?", 19 pages http://panopticlick.eff.org/browser-uniqueness.pdf, accessed Jan. 27, 2011.

Good, N., et al., "Combining Collaborative Filtering with Personal Agents for Better Recommendations," Proceedings of the National Conference on Artificial Intelligence, John Wiley & Sons, LTD., 1999, p. 439-446.

Hearst, M., et al., "Support vector Machines," Intelligent Systems and Their Applications, IEEE, Jul./Aug. 1998, 13 (4)18-28.

Kass, R., et al. "Bayes Factors," Journal of the American Statistical Association, 1995, 90(430):773-795.

Park, S., et al., "Naive Filterbots for Robust cold-Start Recommendations," Proceedings of the 12th ACM SIGKDD International Conference on Knowledge Discovery and Data Mining, ACM, 2006, p. 699-705.

Raftery, A., "Approximate Bayes Factors and Accounting for Model Uncertainty in Generalised Linear Models," Biometrika, 1996, 83(2):251-266.

* cited by examiner

*Primary Examiner* — Alan Chen
*Assistant Examiner* — Mikayla Chubb
(74) *Attorney, Agent, or Firm* — Frommer Lawrence & Haug LLP; John W. Branch (57) ABSTRACT

Embodiments are directed towards clustering cookies for identifying unique mobile devices for associating activities over a network with a given mobile device. The cookies are clustered based on a Bayes Factor similarity model that is trained from cookie features of known mobile devices. The clusters may be used to determine the number of unique mobile devices that access a website. The clusters may also be used to provide targeted content to each unique mobile device.

20 Claims, 8 Drawing Sheets

CLUSTERING COOKIES FOR IDENTIFYING UNIQUE MOBILE DEVICES

TECHNICAL FIELD

The present invention relates generally to managing network activities and, more particularly, but not exclusively to learning identifiers useable to associate activities over a network with a given mobile device.

BACKGROUND

The World Wide Web (WWW) has been growing extremely fast in recent years and large website, such as Yahoo!, Inc attract hundreds of millions of unique visitors every month. Many of these websites are accessed by users anonymously, without requiring registration or logging-in. Yet, to provide personalized service these sites often seek to build anonymous, yet persistent, user models based on repeated user visits. There is also a desire to count the number of unique visitors, as well as to track user's behaviors. Therefore, may of these sites relay on browser cookies, that may be issued to a client device when the client device first visits, and may remain there until the cookie is deleted or expires. By using this cookie technology, even if the users have not registered any account to identify themselves on the website, the website can still use the cookies to identify them, track their behaviors, and serve the users relevant content and search results. However, cookies do not last forever: some cookies are removed when a given browser application on the client device closes; some cookies are deleted based on a user request; and other cookies expire over time automatically. Therefore, cookie-based unique visitor counting systems, which are widely implemented in many websites, usually overestimate the number of unique visitors sometimes by large factors. Such problem is sometimes known as the "cookie churn" problem.

Due to the cookie churn problem, many other user-targeted models and applications can be impacted, besides overestimation of the number of unique visitors. For example, in monitoring user behaviors, new-generated cookies usually do not have enough history to provide a sufficient prediction of performance. Similarly, in advertising marketing, advertisers usually want to know how many real users have seen their display advertisements in campaigns (reach) and for each unique visitor how many times the visitor has seen the advertisement (frequency). Simply using cookies to compute reach and frequency for an advertising campaign can be quite biased if many visitors clear their cookies frequently and see the campaign for multiple times.

Thus, in some sites, other mechanisms are sometimes sought to assist in uniquely identifying a user and related activities. For example, many mobile client devices may have a unique identifier, such as a mobile identification number (MIN). However, it has been observed that not all mobile client devices employ MINs. Similarly, while every device may be associated with an Internet Protocol (IP) addresses, many client devices may be associated with multiple, and/or different IP addresses. Relying completely upon such other identifiers may also result in significantly under or over estimating visitors to a site. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art: Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "multimedia content" refers to any content accessible over a network, including, one or more of images, video clips, video stills, or other graphical content, audio clips, and/or textual content, independent of the format in which such multimedia content may be communicated, stored, displayed or otherwise accessed.

As used herein, the terms "machine-learning" and "classifier" refer to any of a variety of machine implemented algorithms that are employed to evolve behaviors based on input data, including, for example, recognizing complex patterns and making intelligent decisions based on the input data, including, such as pattern recognition, classification, and similar actions. Thus, machine-learning algorithms include decision trees, neural networks, support vector machine algorithms, clustering, Bayesian networks, inductive logic programming, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards generating clusters of cookies to identify unique mobile devices for associating activities over a network with a given mobile device. The cookies are clustered based on a Bayes Factor similarity model that is trained from cookie features of known mobile devices. The clusters may be used to determine the number of unique mobile devices that access a website. The clusters may also be used to provide targeted content to each unique mobile device. In one embodiment, the problem space may be simplified by partitioning the cookies into one or more connected components and performing the clustering using the Bayes Factor similarity model over each of the independent connected components for each of the feature sets for the cookies. However, alternative approaches may also be employed to simplify the problem space, including, but not limited to those disclosed below.

Illustrative Operating Environment

Figure 1:
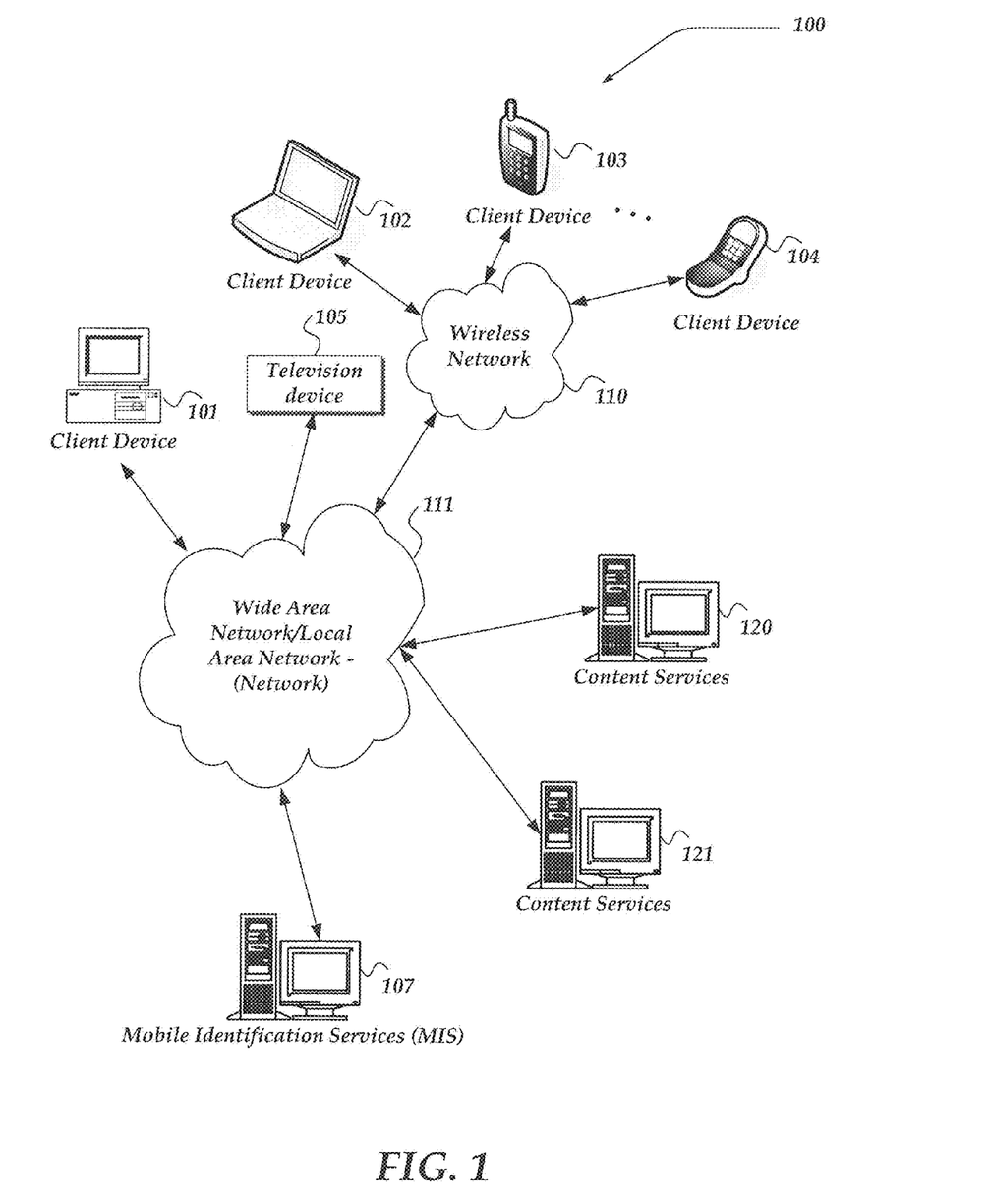
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 111, wireless network 110, client devices 101-105, content service 120-121, and Mobile Identification Services (MIS) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WML-Script, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). For example, the user of the client device may select to manage-various web postings, such as blog postings, postings of articles, posting of photographs, and or other images, video content, audio content, or the like. Similarly, the user of the client device may also employ the browser application to access postings by others, including textual postings, web pages, blogs, news articles, images, and/or any of a variety of other content accessible over networks 110-111. Furthermore, the browser application may allow a user to conduct any of a variety of search queries for content accessible over networks 110-111. However, another application may also be used to perform various online activities.

For example, client devices 101-105 also may include at least one other client application that is configured to receive and/or send content. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. However, in other client devices, such information might not be provided. Thus, some client devices 101-105 might not provide such unique identification. However, may of the client devices 101-105 are configured to provide information about various activities, and/or characteristics about the configuration of the client device. For example, as many of client devices 101-105 visit content services 120-121, they may provide various information about their configuration, including, but not limited to some of the features described below, such as an operation system type, a web browser type, and the like. In one embodiment, at least some of this information might be included in a browser cookie that may then be provided to client devices 101-105 from one of content services 120-121, MIS 107, or the like. Further, in one embodiment, at least some information may be provided in a network packet, or the like, sent between other client devices, content services 120-121, MIS 107, or other computing devices.

Client devices 101-105 may further be configured to include a client application that enables an end-user to log into an end-user account that may be managed by another computing device, such as content services 120-121, MIS 107, or the like. Such end-user account, for example, may be configured to enable the end-user to manage one or more online activities, including for example, search activities, social networking activities, browse various websites, make purchases, sell products/services, communicate with other users, or share content with others, or the like. However, participation in such online networking activities may also be performed without logging into the end-user account.

Moreover, client devices 101-105 may be configured to operate to send messages, and other content for posting through and/or on a content service device, such as 107-108. That is, in one embodiment, a user of client devices 101-105 may select to create and/or otherwise post content within a blog, webpage, or the like, hosted by one or more of content services 120-121 and/or MIS 107.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, content services 120-121, MIS 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content services 120-121 include virtually any network device usable to operate as website servers to provide content to client devices 101-105. Such content may include, but is not limited to webpage content, advertisements, or the like. In one embodiment, content services devices 107-108 might include one or more search engines configured to allow a user to perform network searches for various content. In one embodiment, content services 120-121 might be configured to receive information from client devices 101-105 about the client device, and to provide at least some of the information to the client device within a cookie.

As used herein a cookie, sometimes referred to as a web cookie, browser cookie, Hypertext Transfer Protocol (HTTP) cookie, or the like, is typically a text file consists of one or more name-value pairs containing bits of information, which may be encrypted for privacy purposes. The cookie is sent as an HTTP header by content services 120-121 and then sent back by client devices 120-121 each time it accesses that content service. However, in some situations, such cookies might be purged from the client device, allowed to expire, or the like.

It should be noted that while cookies are disclosed for communicating various information about client devices 101-105, the invention is not so limited, and other mechanisms may also be used. Thus, the invention is not to be construed as being constrained to a single mechanism for obtaining information about client devices.

In any event, content services 120-121 may also operate as a messaging server such as an SMS message service, IM message service, email message service, alert service, or the like. Moreover, content services 120-121 may also operate as a File Transfer Protocol (FTP) server, a database server, music and/or video download server, or the like. Additionally, content services 120-121 may be configured to perform multiple functions.

MIS 107 may include any computing device capable of connecting to network 111 to obtaining information about client devices 101-105 that visit content services 120-121 to provide information about such visitations. Such information may then be employed for a variety of activities, including, for example, to enable content services 120-121 to provide personalized services to a client device, track a reach and frequency for advertising campaigns, monitor usage of services, count visitors, and any of a variety of other activities.

MIS 107 may perform such activities by clustering cookies for identifying unique mobile devices for associating activities over a network with a given mobile device. The cookies are clustered based on a Bayes Factor similarity model that is trained from cookie features of known mobile devices. MIS 107 may employ processes such as those described in more detail below in conjunction with FIGS. 4-8 to perform at least some of its actions.

Devices that may operate as content services 120-121 and MIS 107 include various network devices, including, but not limited to personal computers, desktop computers, multiprocessor systems, microprocessor-based or programmable consumer electronics, network PCs, server devices, network appliances, and the like. It should be noted that while MIS 107 is illustrated as a single network device, the invention is not so limited. Thus, in another embodiment, MIS 107 may represent a plurality of network devices.

Moreover, MIS 107 is not limited to a particular configuration. Thus, in one embodiment, MIS 107 may operate using a master/slave approach over a plurality of network devices, where one of the network devices for MIS 107 operates to manage and/or otherwise perform cookie feature set data collection, while another network device might perform analysis on the cookie feature set data for the client devices. In other embodiments, the MIS 107 may operate within cluster architecture, a peer-to-peer architecture, and/or even within a cloud architecture. Thus, the invention is not to be construed as being limited to a single environment, and other configurations, and architectures are also envisaged. Moreover, in one embodiment functionality of MIS 107 may also be performed in one or more of content services 120-121.

Illustrative Client Device

Figure 2:
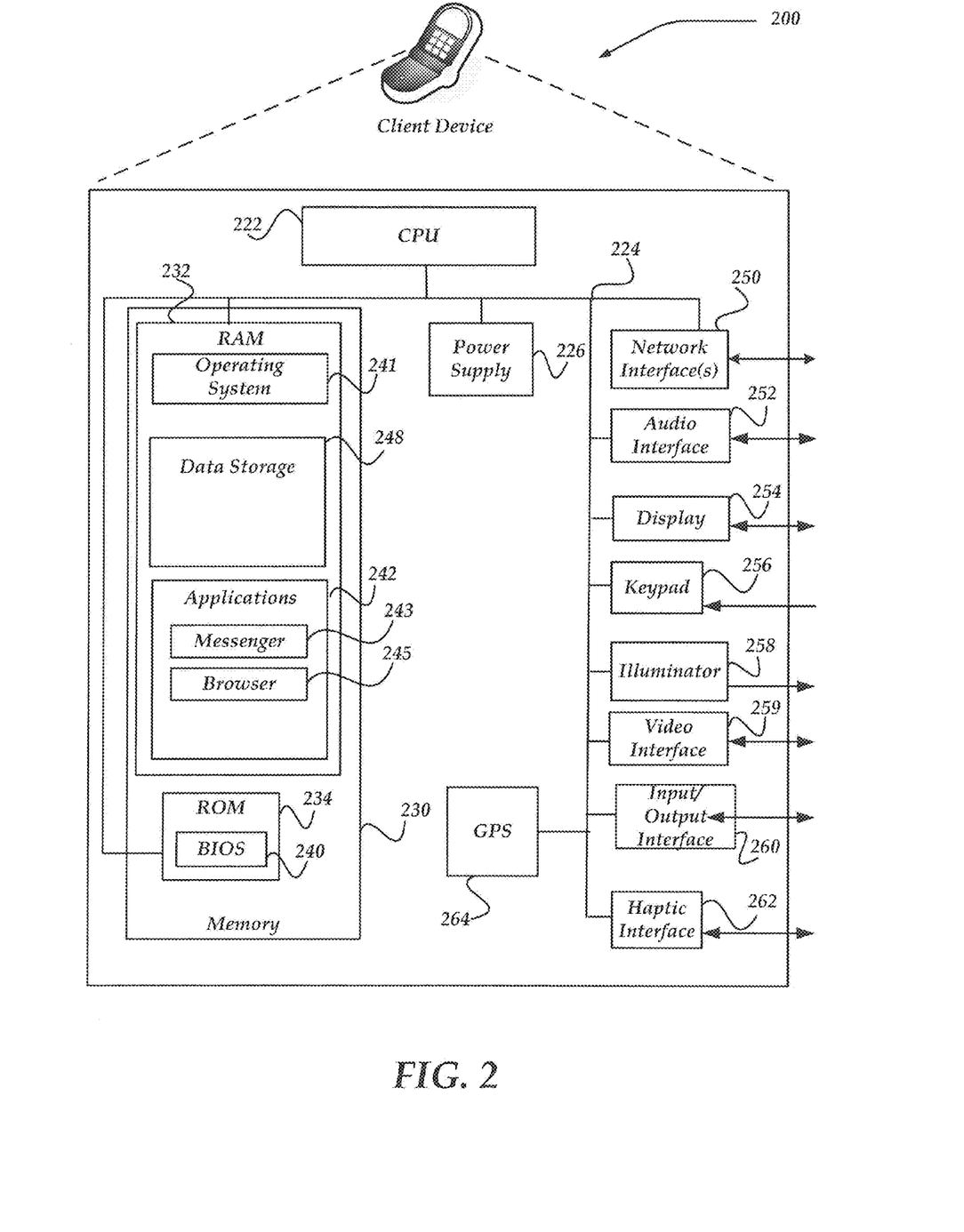
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store information including address books, buddy lists, aliases, user profile information, multimedia content, or the like. Further, data storage 248 may also store cookies, and/or information associated with cookies. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VoIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive content between another computing device for posting, reading, and/or otherwise communicating with another client device. Similarly, browser 245 may enable a user of client device 200 to access one or more search engines to perform various search queries for content, including image content, and/or other multimedia content. Further, browser 245 might receive and/or cause to be stored in data storage 248 one or more cookies, and/or related information.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
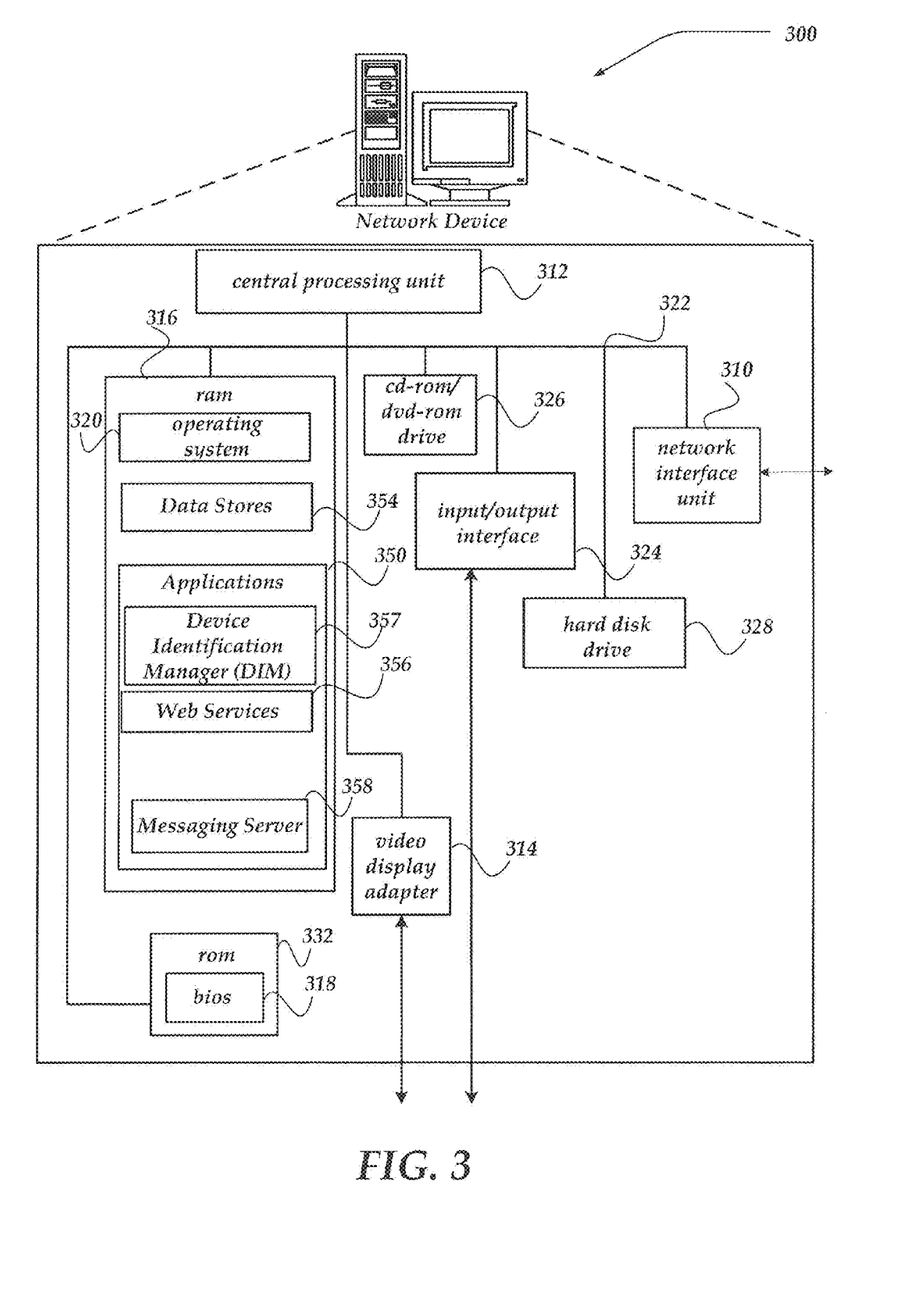
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, ASID 130 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various authoritative scores, citation models, and the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging server 358, and Device Identification Manager (DIM) 357, may also be included as application programs within applications 350.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types. In one embodiment, messaging server 358 may enable users to initiate and/or otherwise conduct chat sessions, VoIP sessions, or the like. As noted elsewhere, messages are also considered as one type of UGC content.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive content, including multimedia content from another network device, such as a client device, or the like. Web services 356 may also manage cookies or other mechanisms for communicating with client devices. Web services 356 might obtain various information about a client device, including, but not limited to an operation system type, a browser type, and/or other information. In one embodiment, at least some of this information might be embedded into one or more cookies that are then provided to the client device, and/or which may be received at some subsequent time from the client device. Other information may also be provided, and/or determined for such cookies, such information being herein referred to feature sets for cookies, as discussed further below.

DIM 357 is configured to obtain the cookies and feature sets, train a Bayes Factor similarity model classifier, and use the trained model to uniquely identify mobile devices. In one embodiment, DIM 357 may cluster cookies on a Bayes Factor similarity model that is trained from cookie features of known mobile devices. The clusters may be used to determine the number of unique mobile devices that access a website. The clusters may also be used to provide targeted content to each unique mobile device. DIM 357 may employ the processes described below in conjunction with FIGS. 4-8 to perform at least some of its actions.

Generalized Operation

Figure 4:
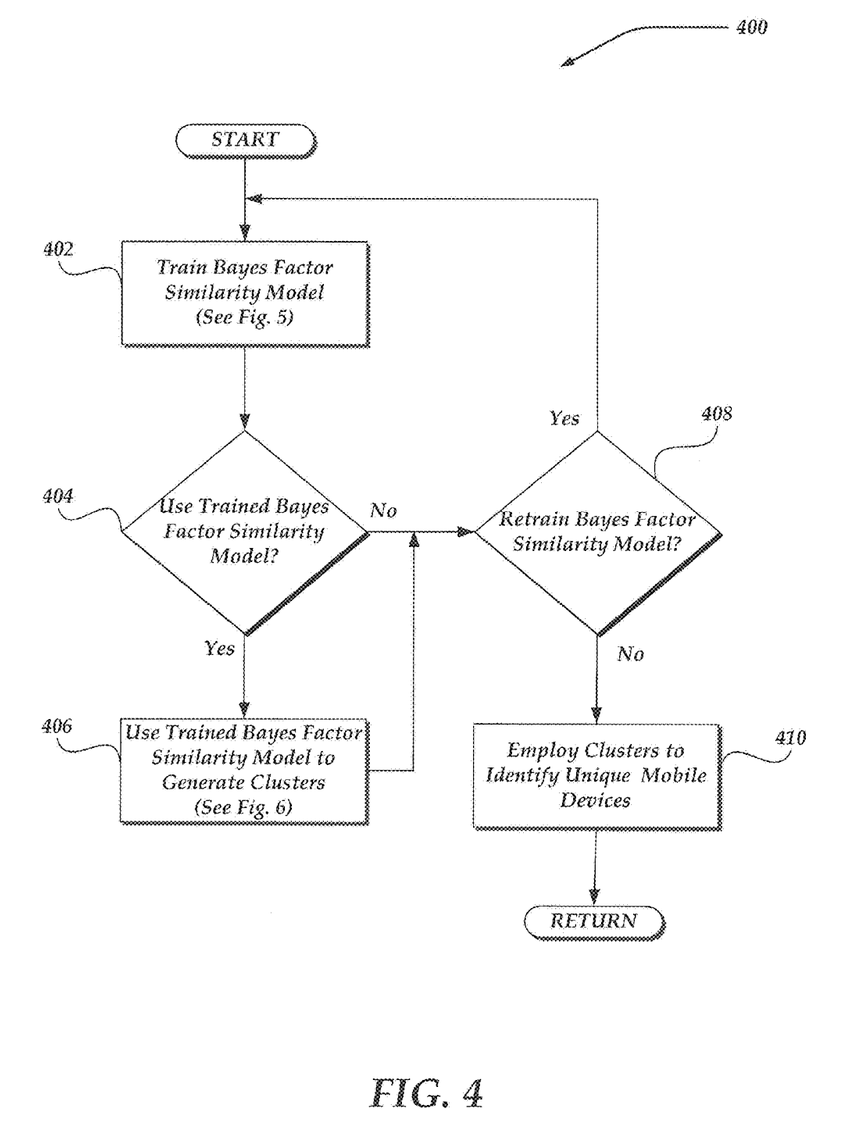
FIG. 4 illustrates a logical flow generally showing one embodiment of an overview process for use in identifying network activities determined to be associated with a same client device.

The operation of certain aspects of the invention will now be described with respect to FIG. 4-8. FIG. 4 illustrates a logical flow diagram generally showing one embodiment of a process for training and using a Bayes Factor similarity model clustering cookies for identifying unique mobile devices. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices.

Process 400 of FIG. 4 begins after a start block, at block 402, which is described in more detail below in conjunction with FIG. 5. Briefly, however, at block 402, a Bayes Factor similarity model is trained. Process 400 then proceeds to decision block 404 where a determination is made whether to use the trained Bayes Factor similarity model. If the determination is made to use the trained Bayes Factor similarity model, then processing flows to block 406, which is described in more detail below in conjunction with FIG. 6; otherwise, processing flows to decision block 408. Brief, at block 406, the trained Bayes Factor similarity model is used to generate clusters to identify unique mobile devices.

At decision block 408, a determination is made whether to retrain the Bayes Factor similarity model. In one embodiment, the clusters generated from block 406 may be used as feedback to retrain the Bayes Factor similarity model. If the determination is made to retrain the Bayes Factor similarity model, then processing loops back to block 402; otherwise, processing may then return to a calling process to perform other actions.

Process 400 then proceeds to block 410 where the generated clusters are employed to identify unique mobile devices. In some embodiments, the generated clusters may be counted to obtain a number of unique mobile devices. In one embodiment, the number of unique mobile devices may identify a total number of users that visit a website. In other embodiments, the cookies inside a generated cluster may be counted to obtain a number of times that the cluster visited a website. Yet, in other embodiments, the generated clusters may be employed to provide relevant content or advertisements to website users. In one embodiment, if a cookie is received by a website and that cookie is part of a cluster, then the website may provide advertisements based on a history of the cookies inside the cluster.

Figure 5:
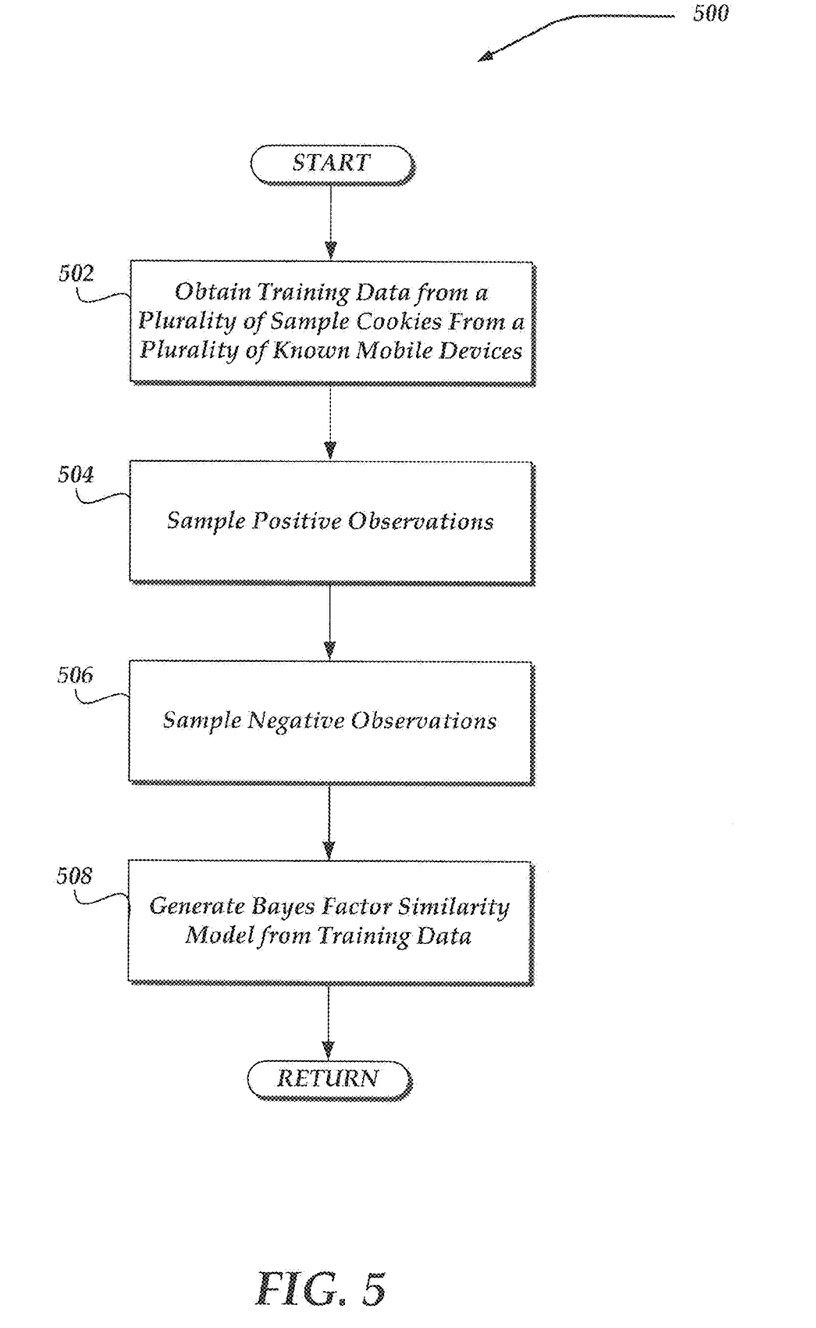
FIG. 5 illustrates a logical flow generally showing one embodiment of an overview process for use in training a Bayes Factor similarity model classifier.

Training of Bayes Factor Similarity Model:

FIG. 5 illustrates a logical flow diagram generally showing one embodiment of a process for training a Bayes Factor similarity model. Process 500 of FIG. 5 begins after a start block, at block 502, where a plurality of sample cookies are obtained from a plurality of mobile devices, where each mobile device has associated with it a known mobile identification number (MIN) or other unique identifier. Each sample cookie in the plurality of sample cookies is obtained from a plurality of known mobile devices. In some embodiments, a plurality of cookies may be obtained from one or more of the plurality of mobile devices. Thus, in one embodiment, a mapping may be maintained depicting the association between cookies and the unique mobile device from which the cookies are from. Each of the plurality of sample cookies may have a feature set associated with that cookie.

In one embodiment, the cookie features may include: a start-time; a lifetime length; an operation system type; a web browser type; a number of page views; an IP address usage pattern; a property visiting pattern; and a media cookie.

The start-time as used herein refers to a timestamp when the cookie is created. The start-time is also referred to as a time of birth $t_{b,i}$ for the i-th cookie, where b identifies the mobile device: when i=1, i.e. the first cookie for this mobile device, it may be assumed that $p(t_{b,i})\sim 1$, i.e. it can be generated an time with an improper uniform distribution. When i>1, the start time for the i-th cookie has to be later than the last active timestamp of the cookie i−1. Denote the last active timestamp of the i-th cookies by $t_{a,i}$, and let $\Delta_{b,i}=t_{b,i}-t_{a,i-1}$. In one embodiment, the "inactive gap" $\Delta_{b,i}$ may be modeled as an Exponential distribution, i.e. $\Delta_{b,i}|\lambda_b\sim$Exponential $(\lambda_b)$, and $\lambda_b|a_b,b_b\sim$Gamma$(a_b,b_b)$ as the prior of $\lambda_b$, where, in one embodiment, $a_b$ may be treated as fixed tuning parameter. In one embodiment, $a_b$ may be set to 10. The prior mean parameter $a_b/b_b$ can be estimated from data, such as, in one embodiment, Yahoo! Toolbar data, or another tracking mechanism.

The lifetime length as used herein refers to a time period between the start-time of the cookie and a most recent website access. The lifetime length, $t_l$, of the cookie i may be defined as $t_{l,i}=t_{a,i}-t_{b,i}$. Similar to the start-time feature, $t_{l,i}|\lambda_l\sim$Exponential $(\lambda_l)$, and $\lambda_l|a_l,b_l\sim$Gamma$(a_l,b_l)$ is the prior. In one embodiment, $a_l$ may be set to 10. $a_l/b_l$ is a prior mean parameter, which, in one embodiment, may be estimated from Yahoo! Toolbar data and may be empirically positively correlated to the number of cookies for the mobile device.

The operation system type, $o_i$, as used herein refers to the type of operating system that is running on the mobile device that accesses a website which generates the cookie. In one embodiment the operational system type of a first cookie $o_i\backslash p_o\sim$Multinomial $(p_o)$, where $p_o$ is the mean probability vector of different operating system types an can be, in one embodiment, estimated from Yahoo! Toolbar data. When i>1, $p(oi|o_{i-1})=\delta(o_i, o_{i-1})$, i.e. if $o_i=o_{i-1}$, $p(o_i|o_{i-1})=1$; otherwise 0.δ. In some embodiments, the operating system type may include Windows WP, Windows Vista, Mac, and the like.

The web browser type, $w_i$, as used herein refers to the type of web browser that is being utilized on the mobile device when the cookie is generated. Similar to the operation system type, the browser type of a first cookie $w_i|p_w\sim$Multinomial $(p_w)$, where $p_w$ is a mean probability vector of the different browser types and in some embodiments can be estimated from Yahoo! Toolbar data. When i>1, $p(w_i|w_{i-1})=\delta(w_i, w_{i-1})$. In one embodiment, the web browser type may include Internet Explorer, Firefox, Google Chrome, and the like.

The number of page views, $v_i$ as used herein refers to the number of web page loads that the mobile device requests on a web page that utilizes the cookie. In one embodiment, it may be assumed that $v_i\|\lambda_v\sim$Poisson$(\lambda_v)$, where $\lambda_v|a_v, b_v\sim$Gamma $(a_v, b_v)$ is the prior. In some embodiments, the prior mean $a_v/b_v$ may be estimated from training data, and the prior rate $b_v$ may be a tuning parameter. In one embodiment, $b_v$ as a tuning parameter may be set to be 10. In some embodiments, $a_v/b_v$ may be negatively correlated to the number of cookies for the mobile device.

The IP address usage pattern, $f_i$ as used herein refers to IP addresses associated with the cookie and the number of page views allocated for each IP address. In some embodiments, for cookie i, $f_i$ may indicate the IP addresses used by the cookie and the number of page views allocated for each IP address. In some embodiments, $f_i|v_i, p_f\sim$Multinomial$(v_i, p_f)$, and the unknown mean probability vector $p_f$ may have a prior $p_f\sim$Dirichlet$(\alpha_f s_f)$. The parameter $\alpha_f$ is a vector of the prior mean probabilities of IP address usage which can be obtained from the training data, and $$\sum_j \alpha_{f,j} = 1.$$

In some embodiments, $s_f$ may be a prior sample size and where $s_f=10$.

The property visiting pattern, $g_i$, as used herein refers to the web pages visited by the cookie and the number of page views allocated for each web page. In some embodiments, for cookie i, $g_i$ may indicate website properties visited by the cookie and the number of page views allocated for each property. In one embodiment, website properties may include Yahoo! Finance, Yahoo! Sports, and the like. Similar to the IP addresses usage pattern, in some embodiments, it may be assumed that $g_i|v_i$, $p_g\sim$Multinomial$(v_i, p_g)$, where $p_g|\alpha_g$, $s_g\sim$Dirichlet$(\alpha_g, s_g)$ is the prior. In one embodiment, the parameter $\alpha_g$ may be a vector of the prior mean probabilities of the property visiting pattern, which may come from the training data, and $$\sum_j \alpha_{g,j} = 1.$$

In one embodiment, $s_g$ may be a prior sample size, which may be set to 10.

The media cookie, m, as used herein refers to the information regarding the mobile device's multimedia settings, including the mobile device's screen resolution, media player, internet connection type, or the like. In some embodiments, the media cookie feature may not be present. Otherwise, in other embodiments it may be assumed that $m_l\sim 1$ for a first cookie, and for i>1, $p(m_i|m_{i-1})=\delta(m_i, m_{i-1})$.

Continuing with process 500 to block 504, the positive observations in the training data are sampled. Process 500 ultimately generates a Bayes Factor similarity model from training data as to whether two groups of cookies share a same mobile device model or not. In one embodiment, a mobile device model may be based on the plurality of features of the cookies associated with that particular mobile device. Thus, it may be assumed that the feature sets of the two groups of cookies are x and x'. Therefore, at block 504, two groups of cookies with feature sets respectively x and x' are sampled, such that x and x' are from the same mobile device. In one embodiment, this two groups may be obtained by splitting the cookies from a single mobile device into the x and x'. Such splitting of the cookies from a same known mobile device into two groups that provides sampled positive observations for one training set. That is, both x and x' are positively related to the same (known) mobile device. In some embodiments, splitting the cookies from a single mobile device into x and x' may be performed randomly. In other embodiments, the positive observations may be obtained using a plurality of mobile devices.

Process 500 then proceeds to block 506 where the negative samples are obtained. By creating two groups that are known to be from different mobile devices, another training set is then generated that provides sampled negative observations. In one embodiment, the negative observations may be obtained where x and x' are from different mobile devices, respectively. In some embodiments, the negative observations may be obtained using a plurality of mobile devices.

As seen in blocks 504 and 506, the training sets are arranged based on a priori knowledge of whether the cookies are from a same or a different (known) mobile device. These sampled positive/negative observations may then be employed at block 508 to train the Bayes Factor similarity model to determine whether two groups of cookies belong to a same or a different mobile device. We name the null hypothesis that the two groups of cookies belong to the same mobile device as $H_0$, and the alternative hypothesis that they belong different mobile devices as $H_1$. Thus, continuing to block 508, the Bayes Factor similarity model is generated. In one embodiment, the Bayes Factor similarity model may be generated using $H_0$ and $H_1$ and is defined as $$BF = \frac{p(x \cup x' \mid H_0)}{p(x \mid H_1)p(x' \mid H_1)} = \frac{\int p(x \cup x' \mid \Theta)p(\Theta)d\Theta}{\int p(x \mid \Theta)p(\Theta)d\Theta \int p(x' \mid \Theta)p(\Theta)d\Theta}, \quad \text{Equation (1)}$$

where $$p(x \mid \Theta) = \frac{p(\Delta_b \mid \mu_b, \sigma_b)p(t_l \mid \mu_l, \sigma_l)p(o \mid p_o)}{p(w \mid p_w)p(v \mid \lambda_v)p(f \mid p_f)p(g \mid p_g)p(m)}, \quad \text{Equation (2)}$$

such that $$p(t_l \mid \mu_l, \sigma_l) = \prod_{i=1}^{n} p(t_{l,i} \mid \mu_l, \sigma_l),$$

and $$p(o \mid p_o) = p(o_1 \mid p_o) \prod_{i=2}^{n} p(o_i \mid o_{i-1}), \text{ etc.}$$

where in one embodiment, $\Theta$ may be the set of model parameters for the features=$\{\mu_b, \theta_b, \mu_l, \sigma_l, p_o, p_w, \lambda_v, p_f, p_g\}$, $\mu_b$ and $\mu_l$ may be unknown and may have prior distributions, and $\sigma_b$ and $\sigma_l$ may be fixed as tuning parameters.

In some embodiments, where x and x' belong to the same mobile device, such as in $H_0$, a combined feature set x∪x' may involve reordering of the cookies by start-time.

In one embodiment, from Equation (1) and (2), the Bayes Factor similarity model can be factored into a product of Bayes Factors similarity models for each feature:

$$BF = (BF)_{\Delta_b}(BF)_{t_l}(BF)_o(BF)_w(BF)_v(BF)_f(BF)_g(BF)_m, \quad \text{Equation (3)}$$

where for example, $$(BF)_{\Delta_b} = \frac{\int p(\Delta_b \cup \Delta_b' \mid \mu_b, \sigma_b)p(\mu_b)d\mu_b}{\int p(\Delta_b \mid \mu_b, \sigma_b)p(\mu_b)d\mu_b \int p(\Delta_b' \mid \mu_b, \sigma_b)p(\mu_b)d\mu_b} \quad \text{Equation (4)}$$

In another embodiment, the Bayes Factor similarity model of Equation (3) may be further defined to leverage the importance of certain cookie features, such as two cookies sharing the same IP address. Thus, annealing parameters may be used on the Bayes Factor similarity model for all features:

$$BF_{Annealing} = (BF)_{\Delta_b}^{\beta_1}(BF)_{t_l}^{\beta_2}(BF)_o^{\beta_3}(BF)_w^{\beta_4}(BF)_v^{\beta_5}(BF)_f^{\beta_6}(BF)_g^{\beta_7}(BF)_m^{\beta_8} \quad \text{Equation (5)}$$

where $\beta = \{\beta_1, \ldots, \beta_8\}$ = annealing parameters

Thus, in some embodiments, resulting Equation (5) may be implemented to generate the Bayes Factor similarity model based on the features from the obtained plurality of sample cookies from the plurality of known mobile devices. Process 500 then returns to a calling process.

In alternative embodiments, there may be some binary training data where each observation represents whether two sampled clusters of cookies belong to the same mobile device, and each observation includes the Bayes Factor similarity model for all the features, β can be trained by various types of binary classification models, such as logistic regression, support vector machine, or the like.

Figure 6:
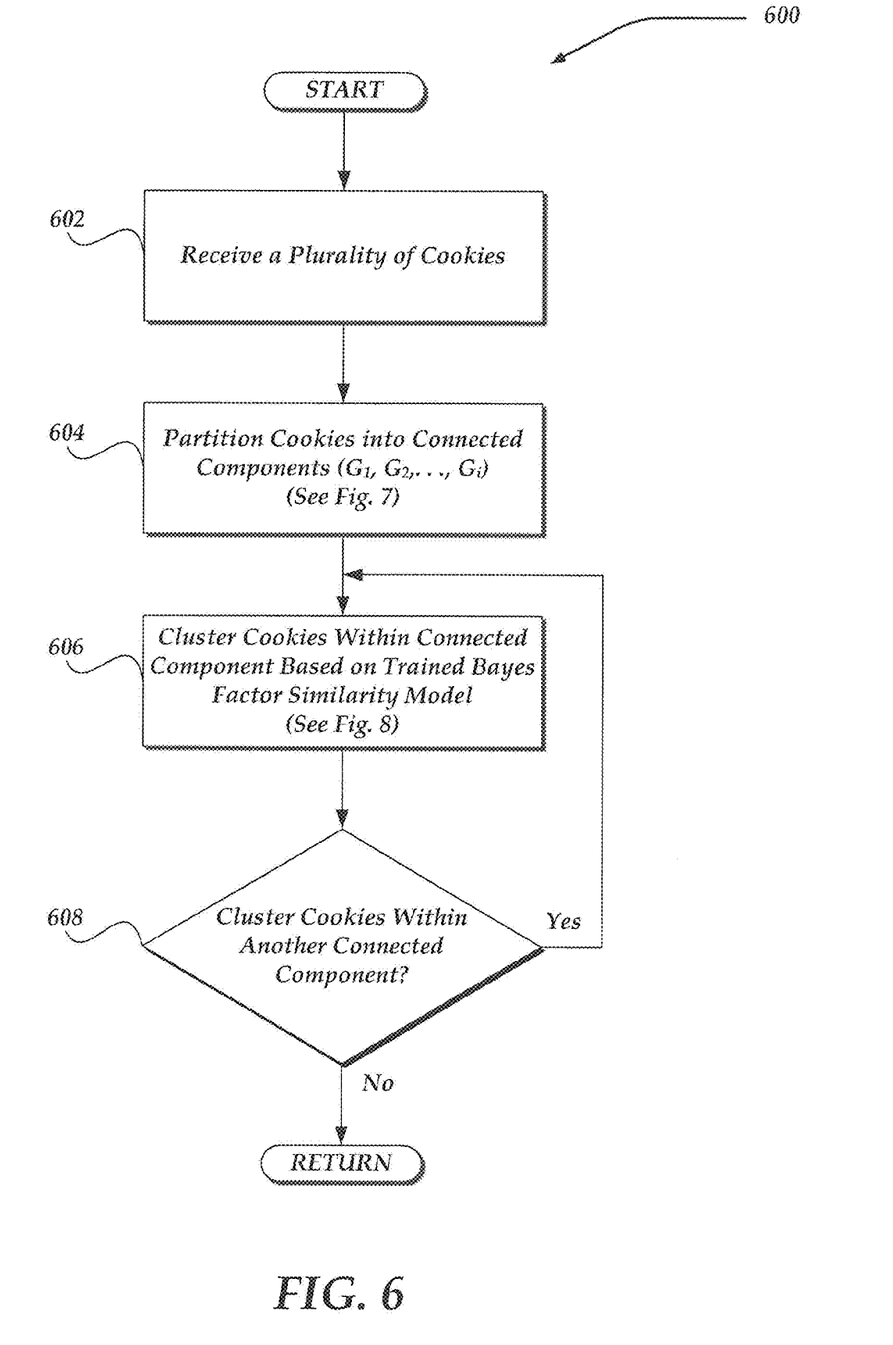
FIG. 6 illustrates a logical flow generally showing one embodiment of an overview process for use in employing the trained Bayes Factor similarity model classifier to cluster network activities to identify activities associated with a same client device.

Using Training Bayes Factor Similarity Model:

FIG. 6 illustrates a logical flow diagram generally showing one embodiment of a process for generating clusters for identifying unique mobile devices by using the trained Bayes Factor similarity model obtained from block 402 of FIG. 4. Process 600 of FIG. 6 begins after a start block, at block 602, where a plurality of cookies is received. When a cookie accesses a website, the cookie may be associated with the internet protocol (IP) address of the mobile device containing the cookie. However, in some embodiments, IP addresses may be dynamic and may change. As a result, a single mobile device and its cookies may use and be associated with many different IP addresses. Thus, in some embodiments, each received cookie may be associated with one or more IP addresses.

Process 600 then proceeds to block 604, which is described in more detail below in conjunction with FIG. 7. Briefly, however, at block 604, a plurality of cookies is partitioned into connected components. Step to block 606, which is described in more detail below in conjunction with FIG. 8 Briefly, however, at block 606, the cookies within a connected component are grouped into unique clusters. Processing then flows to decision block 608 where a determination is made whether to cluster cookies from another connected component. If it is determined to cluster cookies from another connected component, processing loops back to block 606; otherwise, process 600 returns to a calling process. In one embodiment, the determination to cluster cookies from another connected component may be based on an iterative process until all connected components have its cookies clustered.

The plurality of cookies received at block 602 of FIG. 6 may be in the hundreds of thousands of cookies, tens of millions, or more. Due to this large number of cookies, it may be beneficial to partition the plurality of cookies to obtain a smaller dataset, for parallel processing, or the like. FIG. 7 illustrates a logical flow diagram generally showing one embodiment of a process for partitioning the plurality of cookies into connected components based on at least one IP address. It is envisioned that other embodiments of reducing the received cookie dataset are within the spirit or scope of the present invention.

Figure 7:
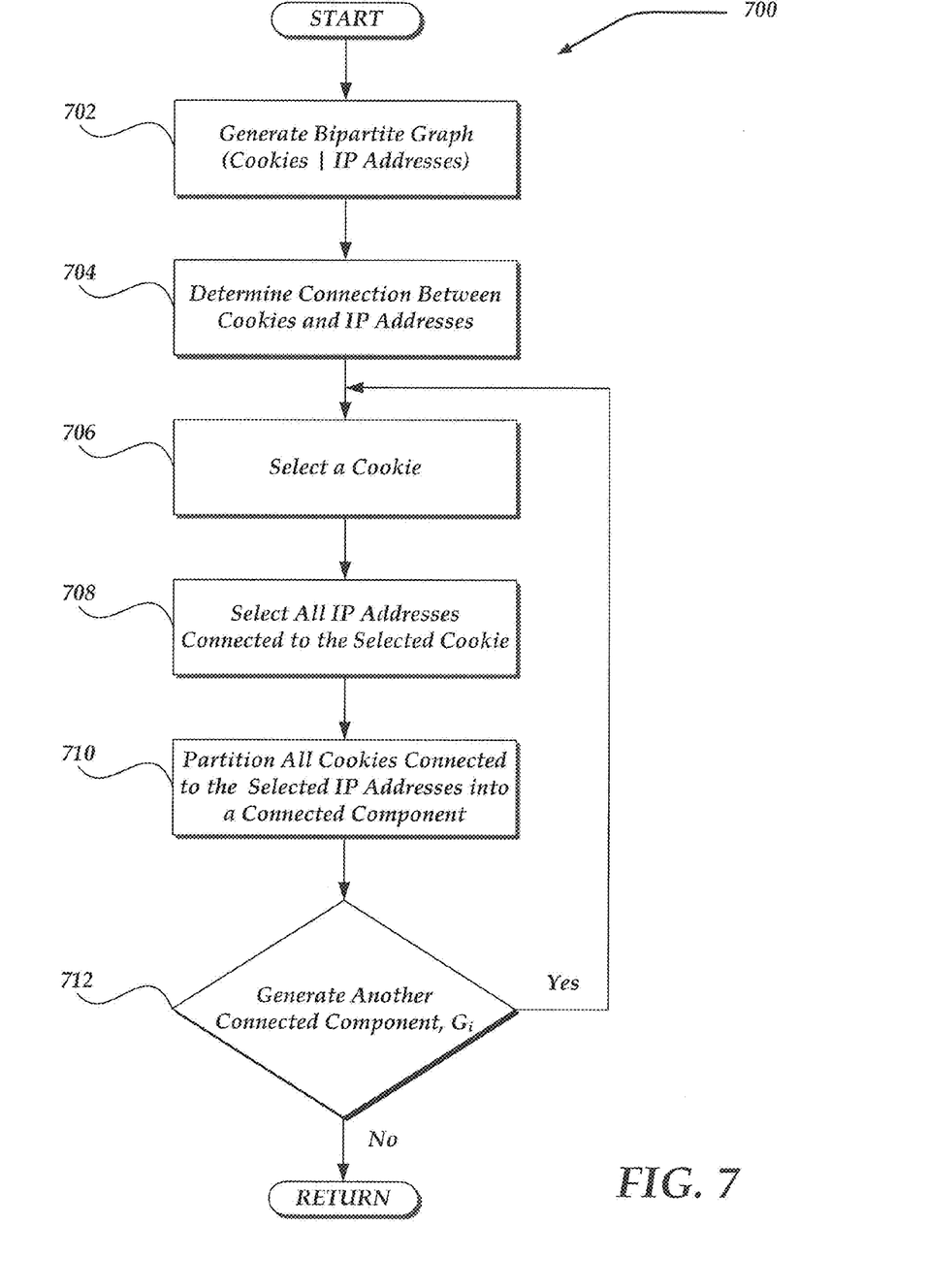
FIG. 7 illustrates a logical flow generally showing one embodiment of an overview process for use in partitioning cookies into connected components.

Process 700 of FIG. 7 begins, after a start block, at block 702, where a bipartite graph is generated. In one embodiment, the bipartite graph may be created by dividing the plurality of cookies into a list of cookies and a list of IP addresses. The list of cookies may be generated based on the received plurality of cookies. Further, the list of IP addresses may be generated, in one embodiment, by observing the IP addresses that accompany each of the plurality of cookies that access a web page. In another embodiment, each of the received plurality of cookies may contain all associated IP addresses. Since IP addresses may be dynamic, in one embodiment, the bipartite graph may include more IP addresses than cookies.

Process 700 then proceeds to block 704 where connections may be made between each of the plurality of cookies and one or more IP addresses. A connection is determined between an IP address and a cookie when the cookie accesses a website from that IP address. As noted above, IP addresses may be dynamic. Thus, a cookie may be accompanied by a different IP address every time it accesses a web page. As a result, in some embodiments, one cookie may be connected to one or more IP address. In other embodiments, one cookie may be connected to one IP address. A connection may be determined for each cookie within the bipartite graph.

Process 700 then proceeds to block 706 where a cookie from the list of cookies is selected. In one embodiment, the selected cookie may be a cookie that was created first. In another embodiment, the selected cookie may be randomly selected.

Process 700 then proceeds to block 708 where all IP addresses that are connected to the selected cookie are selected. Process 700 then flows to block 710 where all cookies connected to the selected IP addresses may be partitioned into a connected component. Thus, the connected component may include one or more cookies.

Process 700 then proceeds to decision block 712 where a determination is made whether to generate another connected component. In one embodiment, this determination may be based on remaining cookies in the list of cookies of the bipartite graph. If there are cookies remaining in the list of cookies that have not been previously partitioned into a connected component, then another connected component may be generated. On the other hand, if all cookies have been partitioned into a connected component, then no other connected component need be generated. Thus, if it is determined to generate another connected component, processing loops back to block 706, otherwise, processing returns to a calling process.

Process 700 may be described by the following non-limiting and non-exhaustive example. Assume the following cookies are received: Cookie_1, Cookie_2, . . . , and Cookie_5. Further, assume the following connections have been made between cookies and IP addresses: Cookie_1 is connected to IP addresses XX and YY; Cookie_2 is connected to IP addresses AA, BB, and CC, Cookie_3 is connected to IP addresses AA and MM, Cookie_4 is connected to IP addresses YY, and Cookie_5 is connected to IP addresses YY.

Following process 700, at block 708, Cookie_1 may be selected. Next, at block 708, IP address XX and YY may be selected because XX and YY are connected to Cookie_1. After XX and YY are selected, at block 710, all cookies connected to XX and YY may be partitioned into a connected component. As a result, Cookie_1, Cookie_4, and Cookie_5 are partitioned into a connected, including IP addresses XX and YY. The cookies that are not included in the connected component remain in the list of cookies as available for partitioning. In this example, therefore, since cookies remain in the list of cookies that are not in a connected component, process 700 loops back to block 706 where another cookie is selected, such as Cookie_2. Process 700 then proceeds with Cookie_2 until all cookies are in a connected component.

Figure 8:
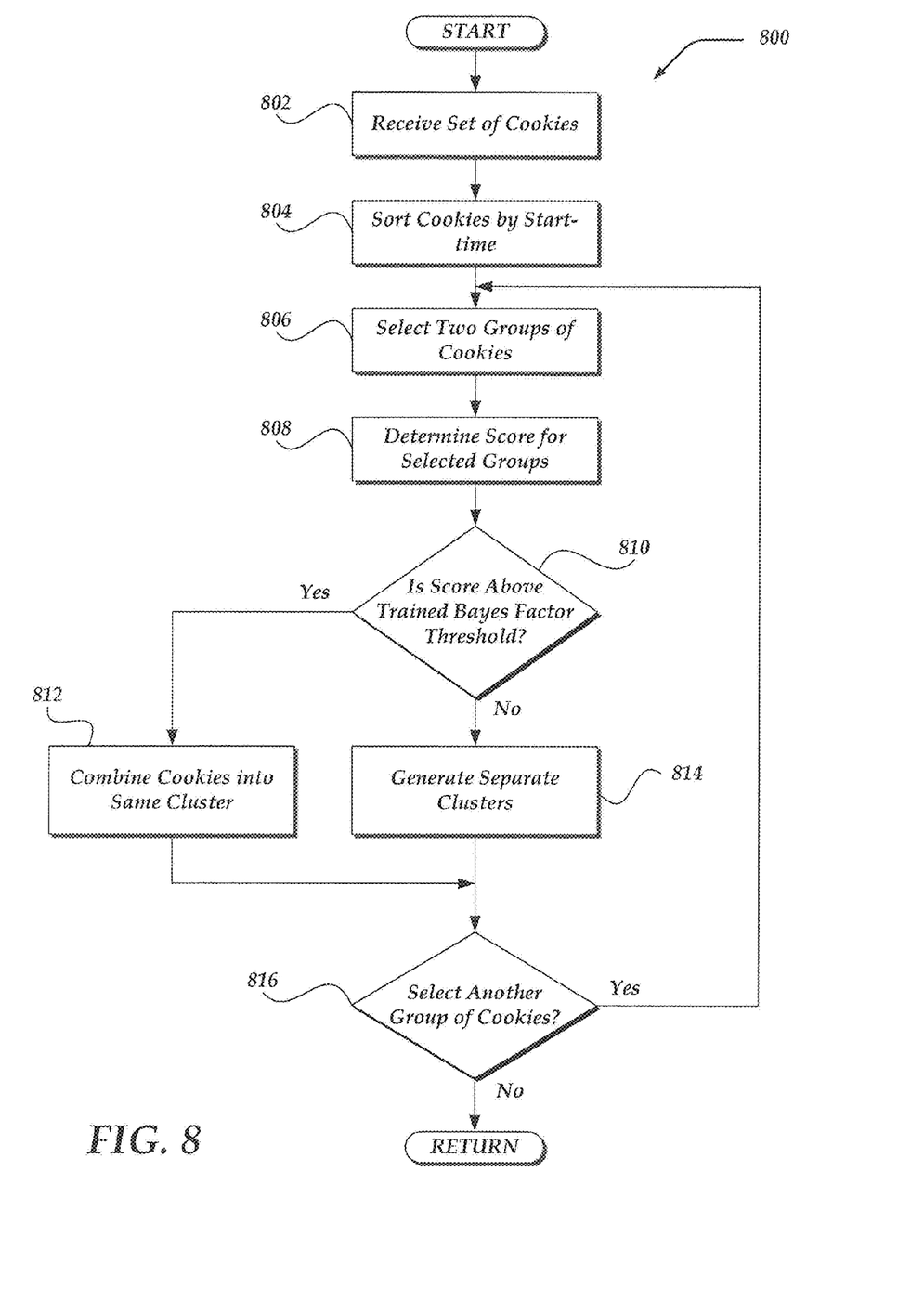
FIG. 8 illustrates a logical flow generally showing one embodiment of an overview process for use in clustering cookies using connected components and the trained Bayes Factor Similarity model classifier.

After FIG. 8 illustrates a logical flow diagram generally showing one embodiment of a process for generating clusters of one or more cookies within each of one or more connected components based on the Bayes Factor similarity model.

Process 800 of FIG. 8 begins, after a start block, at block 802, where a set of one or more cookies is received. In one embodiment, the set of cookies is a set of cookies from a connected component, such as one of the connected components generated by process 700 of FIG. 7.

Process 800 then proceeds to block 804 where the cookies are sorted by start-time. Since two cookies with the same start time cannot be from the same mobile device, a cluster is generated for each overlapping cookie. The remaining non-overlapping cookies may then proceed to block 806; otherwise, if all cookies start-times over overlap then process 800 returns to a calling process.

Continuing to block 806, two groups of cookies are selected. In some embodiments, at least one of the groups may contain one cookie. In other embodiments, at least one of the groups may contain a plurality of cookies. Further, in some embodiments, the two groups of cookies may be selected randomly. In other embodiments, two groups of cookies may be selected incrementally starting with the cookie with the earliest start-time.

In one embodiment, both groups of cookies may be selected from the same connected component. In another embodiment, one group of cookies may come from a single connected component and the other group of cookies may come from a previously generated cluster. The previously generated cluster may, in one embodiment, include cookies from within the same connected component. In other words, clusters within a connected component may be formed one at a time and subsequent cookies may be compared to the previously generated cluster. Yet, in another embodiment, the previously generated cluster may include cookies not from within the same connected component and not in other connected components.

Process 800 then proceeds to block 808 where a score for the selected groups is determined. The score may be based on a probability that the two groups of cookies belong to the same mobile device given a set of features for the cookies within both groups. In one embodiment, the score may be determined by using the trained Bayes Factor similarity model defined by Equation (5) of block 508 of FIG. 5. The trained Bayes Factor similarity model uses the features of the selected two groups of cookies to determine the score on how similar are the two groups of features.

If the score is greater than a threshold value, then the two groups of cookies may be deemed to belong to the same mobile device. If the score is lower than the threshold value, the two groups of cookies may be deemed as not belonging to the same mobile device.

Process 800 then flows to decision block 810 where a determination is made whether the determined score is above a threshold value, T. In some embodiment the T may be set to maximize a sum of a true positive rate and a true negative rate. In one embodiment, using a set T value, the trained Bayes Factor similarity model, as determined by Equation (5) of block 508 of FIG. 5, may have a true positive rate of 83% and a false positive rate of 20.3%. In other embodiments, other values of T may be used.

If the determination is made that the determined score is above the threshold value, T, then the two groups of cookies may be deemed to belong to the same mobile device and process 800 proceeds to block 812; otherwise, the two groups of cookies may be deemed as not belonging to the same mobile device and process 800 proceeds to block 814. At block 812, the selected two groups of cookies may be combined into a single cluster. In contrast, at block 814 separate clusters may be generated for each of the selected group of cookies.

From block 812 and block 814 process 800 proceeds to decision block 816, where a determination is made whether another group of cookies is selected from the connected component. In one embodiment, another group of cookies may be selected if there are additional cookies in the connected component that has not clustered. If it is determined that another group of cookies may be selected, process 800 loops back to block 806; otherwise, processing returns to a calling process.

It should be noted that while mobile devices are discussed above, the invention is not constrained to merely tracking and uniquely identifying mobile (client) devices. For example, the above disclosed processes may be employed to track and uniquely identify virtually any client device, including, for example, combinations of non-mobile and mobile client devices.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Alternative Embodiments

As described above, the number of cookies received at block 602 of FIG. 6 may be very large. As a result, it may be beneficial to partition the plurality of cookies to obtain a smaller dataset, for parallel processing, or the like. In alternative embodiments, the partitioning process described by process 700 of FIG. 7 may be performed by cookie frequency partitioning. Cookie frequency partitioning may utilize the concept that most mobile devices access a website in some pattern, such as every day or every few days. Thus, only clusters of cookies that are updated frequently are maintained for augmentation. In other words, if a cluster is not updated with a cookie by some given period then the cluster is no longer maintained for augmentation. In one embodiment, this given period is a set number of total events, such as a total number of cookies accessing a website. In one embodiment, a cluster may be updated when a new cookie is added to that cluster, such as through the use of process 800 of FIG. 8, where the cluster and the new cookie are combined into the same cluster at block 810. Thus, clusters that are maintained for augmentation may be stored in a memory or other computer-readable storage device for use by a process, such as process 800 of FIG. 8.

In one embodiment, if the cluster is not updated with a cookie by the given period, then the cluster is retired. In one embodiment, retired clusters may be stored and deemed as a separate mobile device, but the retired cluster may not be augmented, such as by process 800 of FIG. 8. In another embodiment, each cluster may be updated as some relative frequency. Thus, if there is a break or change in the relative frequency, then the cluster may be retired, as described above. In one non-limiting example, a cluster may be updated at a relative frequency of every two days. If the cluster is not updated by day three, then the cluster may be retired.

In other alternative embodiments, the partitioning process described by process 700 of FIG. 7 may be performed by cookie visiting time partitioning. Cookie visiting time partitioning may be based on the concept that a single mobile device may not contain two cookies that were created at the same time. Similarly, a single mobile device may not have two cookies that access a website such that one cookie accesses the website between two accesses by the other cookie. In other words, no two cookies from the same mobile device overlap in lifetime length. For example, Cookie1 accesses a website on Monday and Wednesday and Cookie2 accesses the same website on Tuesday. Cookie1 and Cookie2 may not be from the same mobile device. Thus, each cookie may be partitioned by the start-time, where any two or more cookies that have the same start-time may be placed in separate clusters. Similarly, two cookies that have an overlapping lifetime length may also be placed in separate clusters. Once an initial group of clusters are generated, new cookies may be compared to those clusters, such as by process 800 of FIG. 8. Thus, at any given time, all new cookies born at that time may utilize process 800 of FIG. 8 to determine which clusters the new cookies belong.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on one or more network devices, the method comprising:
   receiving a plurality of cookies, wherein each cookie is associated with one or more Internet Protocol (IP) addresses;
   partitioning the plurality of cookies into one or more connected components based on the one or more IP addresses, each of the one or more connected components including one or more cookies from the plurality of cookies; and
   for each of the one or more connected components, generating one or more clusters of cookies based on a Bayes Factors similarity between cookies within a given connected component being above a threshold, wherein each of the one or more clusters is associated with a unique mobile device.

2. The method of claim 1, wherein the method further comprising:
   sorting the one or more cookies within each of the one or more connected components based on a start-time associated with each of the one or more cookies.

3. The method of claim 1, wherein the method further comprising:
   employing the clusters to identify a plurality of unique mobile devices, wherein each cluster is determined to be statistically associated with a unique mobile device.

4. The method of claim 1, wherein the Bayes factor similarity further comprises a Bayes Factor similarity model based on training data obtained from a plurality of known mobile devices.

5. The method of claim 4, wherein the method further comprising:

employing the clusters as feedback to retrain the Bayes Factor similarity model.

6. A network device, comprising:
a transceiver to send and receive data over a network; and
a processor that is operative on the received data to perform actions, including:
receiving a plurality of cookies;
partitioning the plurality of cookies into one or more subsets, wherein each of the one or more subsets includes one or more cookies; and
clustering the one or more cookies within each of the one or more subsets based on a Bayes factors similarity of feature sets between cookies being above a threshold, wherein each cluster is associated with a unique mobile device.

7. The network device of claim 6, wherein the partitioning of the plurality of cookies into one or more subsets further comprises partitioning the plurality of cookies into one or more connected components based on one or more cookie IP addresses, wherein each of the one or more connected components includes one or more cookies.

8. The network device of claim 6, wherein partitioning the plurality of cookies into one or more subsets further comprises partitioning the plurality of cookies into one or more subsets based on a start-time of each of the plurality of cookies.

9. The network device of claim 6, wherein partitioning the plurality of cookies into one or more subsets further comprises partitioning the plurality of cookies into one or more subsets based an access frequency of each of the plurality of cookies.

10. The network device of claim 6, wherein the processor is operative to perform actions, further comprising:
sorting the one or more cookies within each of the one or more subsets by a start-time.

11. The network device of claim 6, wherein the processor is operative to perform actions, further comprising:
employing the clusters to identify a plurality of unique mobile devices, wherein each cluster is a unique mobile device.

12. The network device of claim 6, wherein the feature sets includes at least one of a start-time or a lifetime length; and wherein the Bayes Factor similarity model is based on a combination of Bayes Factors for each of a plurality of features in the feature set.

13. A system, comprising:
at least one network device that manages a communications over a network; and
one or more other network devices that are configured to perform actions, including:
receiving a plurality of cookies;
partitioning the plurality of cookies into one or more subsets, wherein each of the one or more subsets includes one or more cookies; and
clustering the one or more cookies within each of the one or more connected components based on a Bayes factors similarity of feature sets between cookies being above a threshold, wherein each cluster is associated with a unique mobile device.

14. The system of claim 13, wherein the one or more other network devices are further configured to perform actions, comprising:
partitioning the plurality of cookies into one or more connected components based on one or more cookie IP addresses, wherein each of the one or more connected components includes one or more cookies.

15. The system of claim 13, wherein the one or more other network devices are further configured to perform actions, comprising:
partitioning the plurality of cookies into one or more subsets based on a start-time of each of the plurality of cookies.

16. The system of claim 13, wherein the one or more other network devices are further configured to perform actions, comprising:
partitioning the plurality of cookies into one or more subsets based on an access frequency of each of the plurality of cookies.

17. The system of claim 13, wherein the one or more other network devices are further configured to perform actions, comprising:
sorting the one or more cookies within each of the one or more subsets by a start-time.

18. The system of claim 13, wherein the one or more other network devices are further configured to perform actions, comprising:
employing the clusters to identify a plurality of unique mobile devices, wherein each cluster is a unique mobile device.

19. The system of claim 13, wherein the Bayes factor similarity further includes a Bayes Factor similarity model based on training data obtained from a plurality of known mobile devices.

20. The system of claim 13, wherein the actions further comprising:
computing the Bayes Factor similarity for cookies based on the feature sets as a combination of Bayes Factors for each feature in the feature set, wherein at least one of the features includes a start-time, a lifetime length, an operation system type, a web browser type, a number of page views, an IP address usage pattern, or a property visiting pattern.

* * * * *